(12) United States Patent
Chang

(10) Patent No.: US 6,172,340 B1
(45) Date of Patent: Jan. 9, 2001

(54) STRUCTURE OF A HOT WATER BOTTLE

(76) Inventor: Kwei-Tang Chang, No. 14, Lane 54, Luong Chaun St., Panchiao City, Taipei Hsien (TW)

( * ) Notice: Under 35 U.S.C. 154(b), the term of this patent shall be extended for 0 days.

(21) Appl. No.: 09/317,126

(22) Filed: May 24, 1999

(51) Int. Cl.[7] .................................................. F27D 11/00
(52) U.S. Cl. .................. 219/438; 220/62.12; 220/62.14; 99/323.3
(58) Field of Search ..................................... 219/438, 439, 219/440, 441, 442; 392/444; 222/146.5, 146.2; 99/323.3, 337, 403, 275, 341; 220/62.12, 62.14, 62.15, 671, 669, 670, 592.26, 592.16, 592.17

(56) References Cited

U.S. PATENT DOCUMENTS 3,549,861 * 12/1970 Trachtenberg et al. .............. 219/441
5,762,230 * 12/1970 Policappelli .......................... 220/461

* cited by examiner

Primary Examiner—Teresa Walberg
Assistant Examiner—Shawntina Fuqua
(74) Attorney, Agent, or Firm—Rosenberg, Klein & Lee

(57) ABSTRACT

A hot water bottle includes a bottle bottom, a bottle body, and a bottle cover. The bottle body is made of transparent glass which allows the level of water to be seen clearly from the outside of the bottle. A plurality of protective strips, with proper distribution, are formed on the outer surface of the bottle body to protect the user's hand by acting as a heat isolation barrier.

9 Claims, 6 Drawing Sheets

STRUCTURE OF A HOT WATER BOTTLE

BACKGROUND OF THE INVENTION

1. Field of the Invention

The present invention relates to a hot water bottle, and especially to a hot water bottle with a novel structure wherein the boiling water is heated electrically, the hot water bottle has a simple structure, thus the user may use the hot water bottle more safely.

2. Description of the Prior Art

The conventional hot water bottle is formed by a bottle bottom, a bottle body and a bottle cover. The bottle bottom is installed with proper heating and water outlet devices for heating water and outputting water by pressing a bottom. However, the conventional hot water bottle is made of metal or plastic or other opaque materials. Only a longitudinal transparent tube is formed on one side thereof so that users may view the level of mater through the tube. However, the view area of the tube is very thin, thus user often needs to rotate the hot water bottle or squat down for viewing the level clearly. Moreover, due to the vapor in the bottle, capillary effect, or unbalance of pressure, thus the level in the tube is not the real level of the water within the bottle.

Moreover, since the general hot water bottle has a smooth surface and has no effect of heat isolation. Thus, the temperature distribution of the surface thereof is not uniform, thus, if a user touches the bottle body carelessly, he (or she) will be probably harmed. Even the hot water will pour out, thus a great potential danger is existed.

SUMMARY OF THE INVENTION

Accordingly, the object of the present invention is to provide an improved structure of hot water bottle comprising a bottle bottom, a bottle body and a bottle cover. The bottle body is made of transparent glass. The level of water can be seen clearly from outside. They, it is needless to rotate the bottle body or to move near the bottle body. Moreover, the level will not be judged by mistake. Thus, it is more convenient than the prior art.

Another object of the present invention is to provide an improved structure of a hot water bottle, wherein other than being formed by transparent glass, a plurality of protecting strips are distributed on the surface of the bottle body with proper distribution and material so as to locally increase the width of the bottle body and thus a temperature grading for heat isolation is formed. Accordingly, the user's hand is protected from being harmed by high temperature.

A further object of the present invention is to provide an improved structure of a hot water bottle, especially, the bottle body is a single means integrally made of glass. Thus, the structure thereof will more simple than the conventional hot water bottle, and thus it can be made easily and may be mass-produced with a lower cost.

The present invention will be better understood and its numerous objects and advantages will become apparent to those skilled in the art by referencing to the following drawings in which:

DETAILED DESCRIPTION OF THE PREFERRED EMBODIMENT

Figure 1:
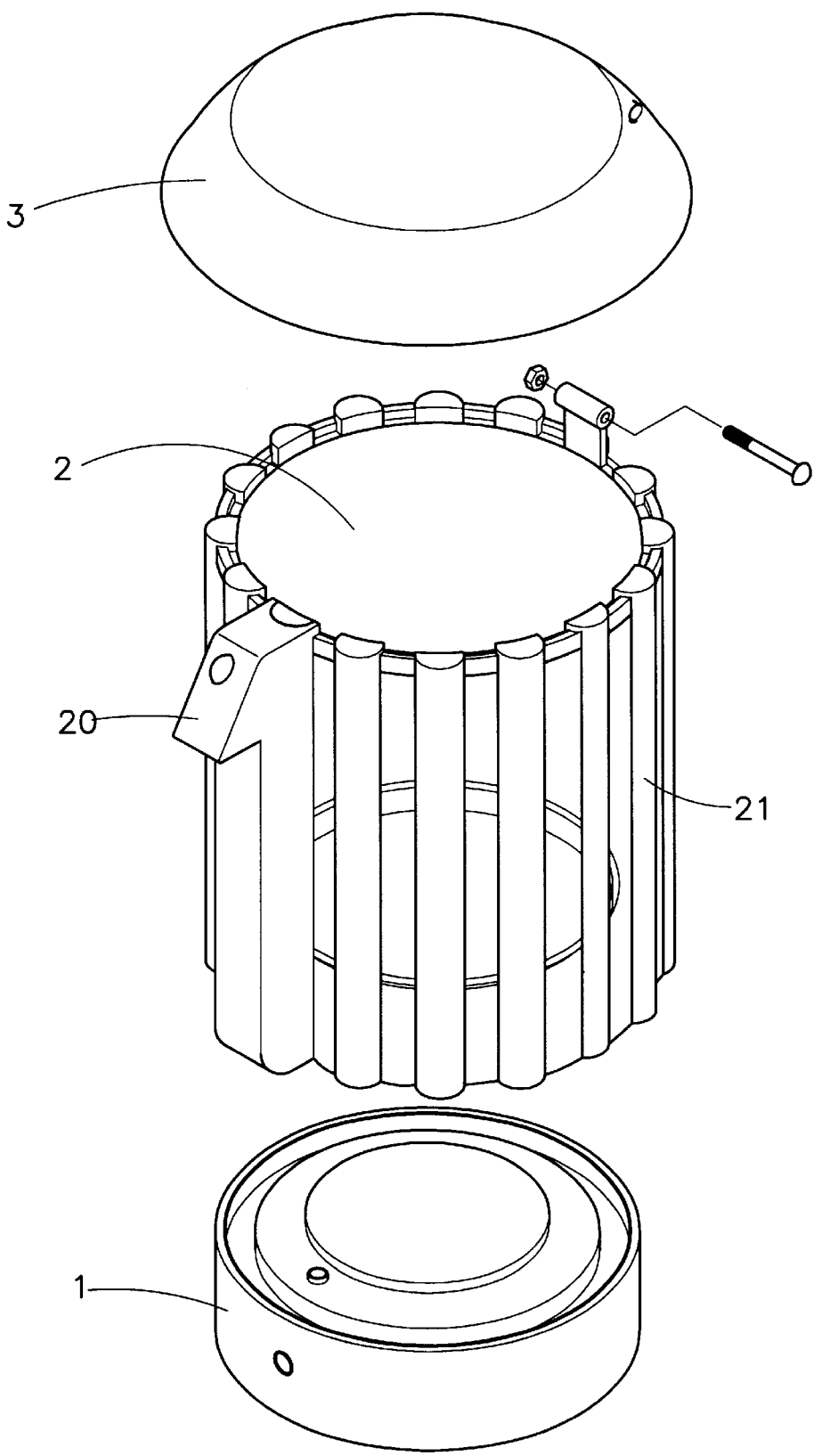
FIG. 1 is an exploded perspective view of the embodiment according to the present invention.
Figure 2:
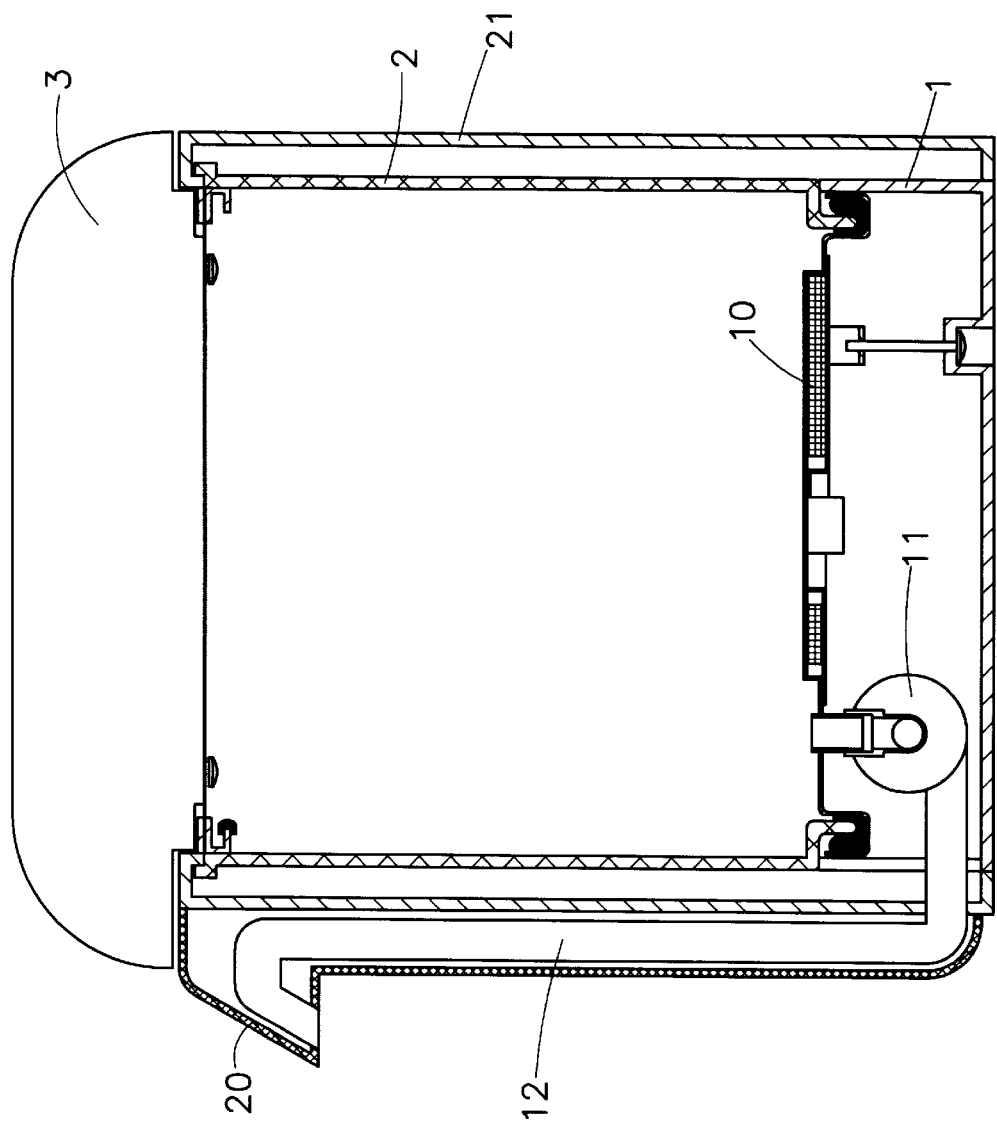
FIG. 2 is a simple schematic view of the assembled structure in the embodiment according to the present invention.

With reference to FIGS. 1 and 2, an exploded perspective view and assembled cross sectional view of the improved structure of a hot water bottle according to the present invention is illustrated. The hot water bottle of the present invention primarily includes a bottle bottom 1, a bottle body 2, and a bottle cover 3. The bottle bottom 1 and the bottle cover 3 may be enclosed by plastic and other transparent material. A heating device 10 and a water output device 11 are installed at the bottle bottom 1 for heating the water within the bottle bottom 2 and outputting water from a water output tube 12 and bottle mouth 20 at one side of the bottle body 2. The bottle cover 3 is pivotal installed at the rear side of the bottle bottom 2. The special feature of the hot water bottle is that the bottle bottom 2 is formed integrally by a transparent glass, and a plurality of protecting strips 21 with a proper distribution are formed on the outer surface thereof. The protecting strip 21 with the bottle body 2 may be formed integrally with transparent glass or the protecting strip may be extra added to the bottle body 2 and has a different color, transparency, and material (such as acryl, plastic, or other materials with bad heat transferring property but better heat isolation effect, for example, heat isolation ceramic) from the bottle body 2.

Figure 3:
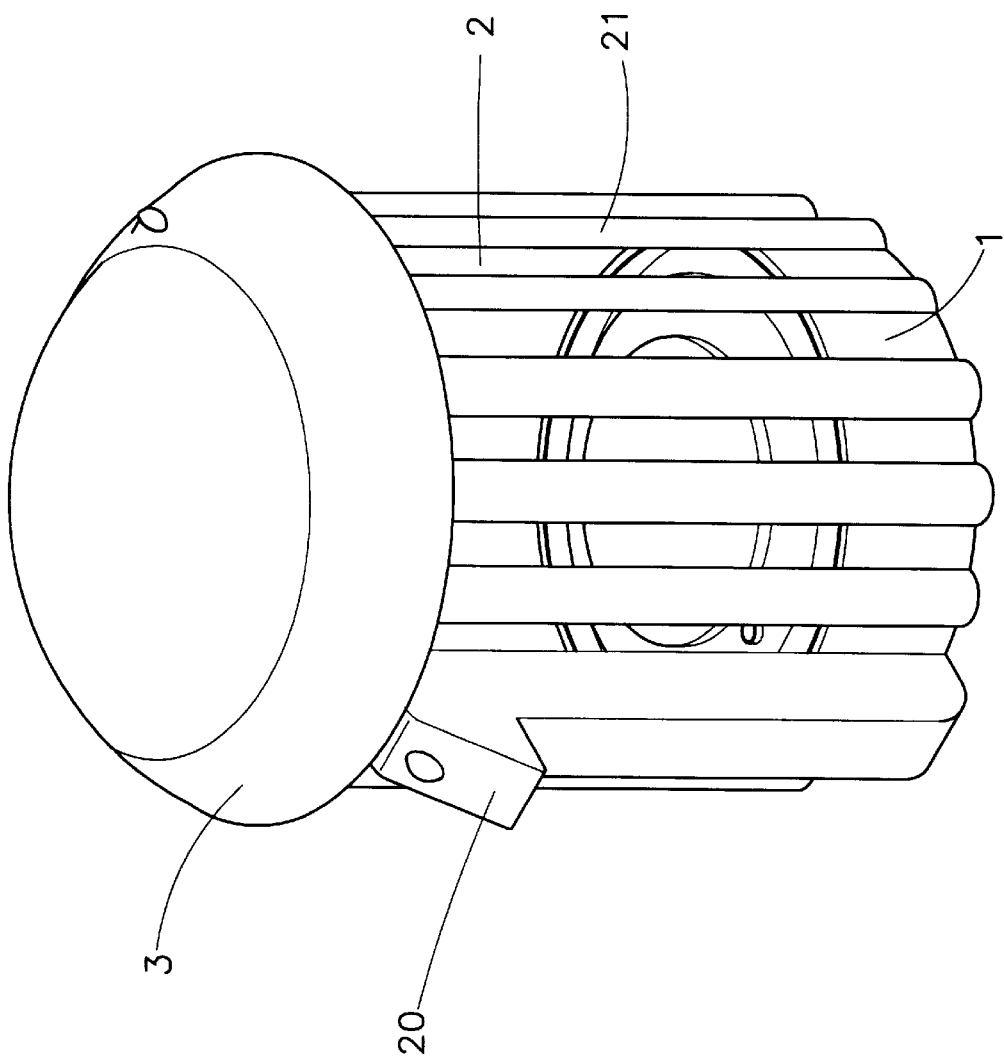
FIG. 3 is a perspective view showing the outlook of the assembled structure of the embodiment according to the present invention.
Figure 4:
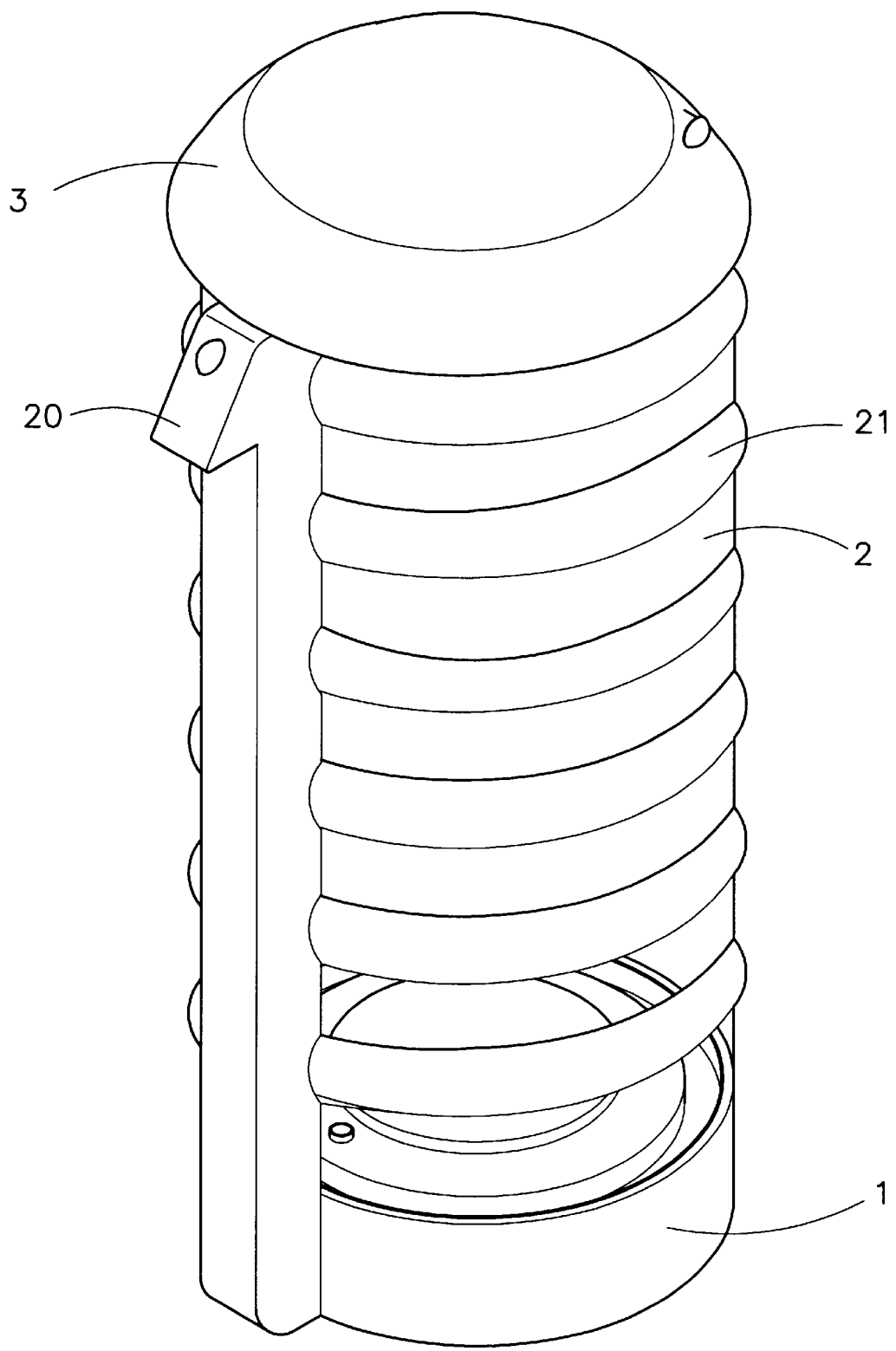
FIG. 4 is a perspective view showing the outlook of the assembled structure of another embodiment according to the present invention.
Figure 5:
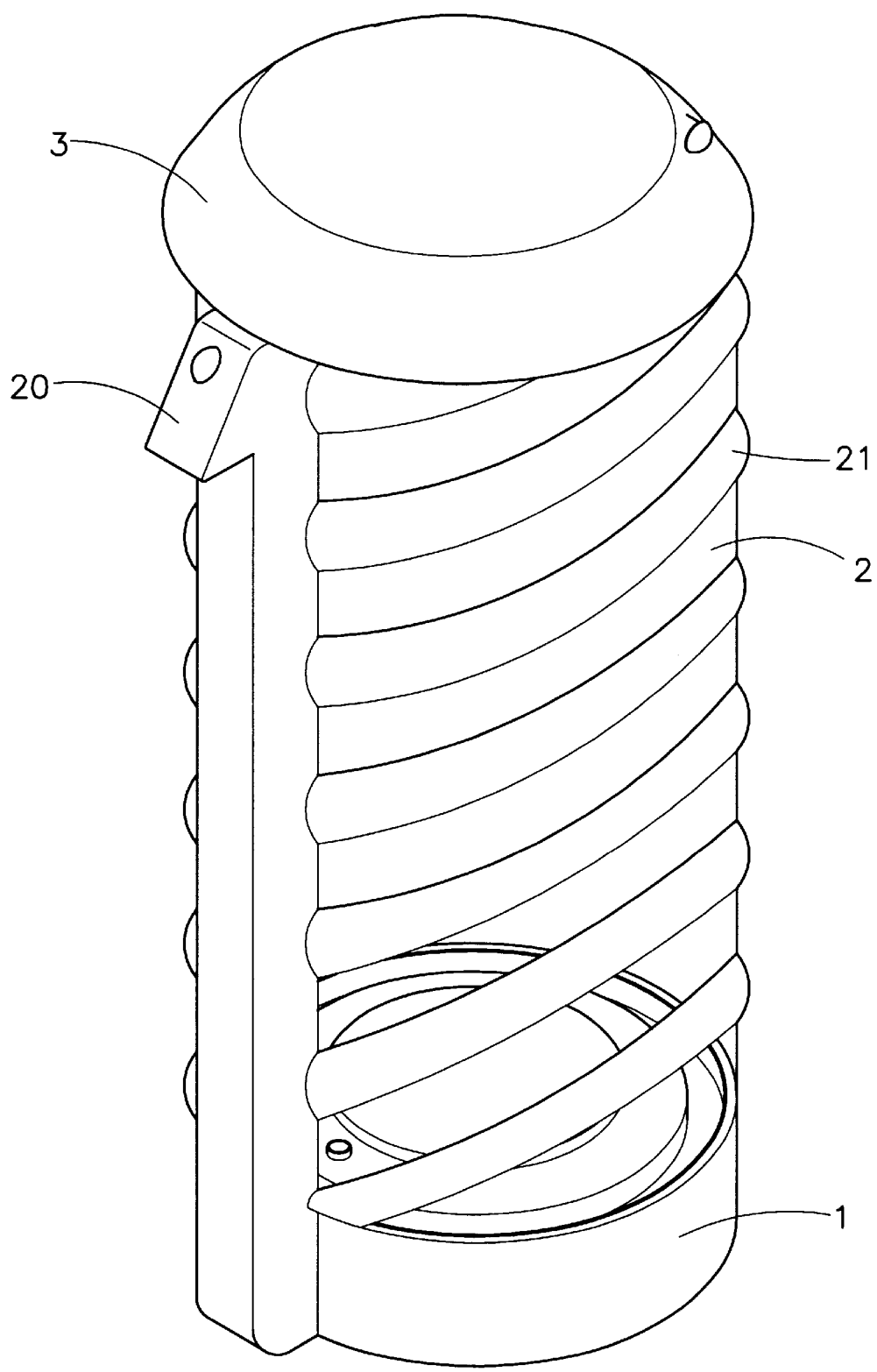
FIG. 5 is a perspective view showing the outlook of the assembled structure of a further embodiment according to the present invention.
Figure 6:
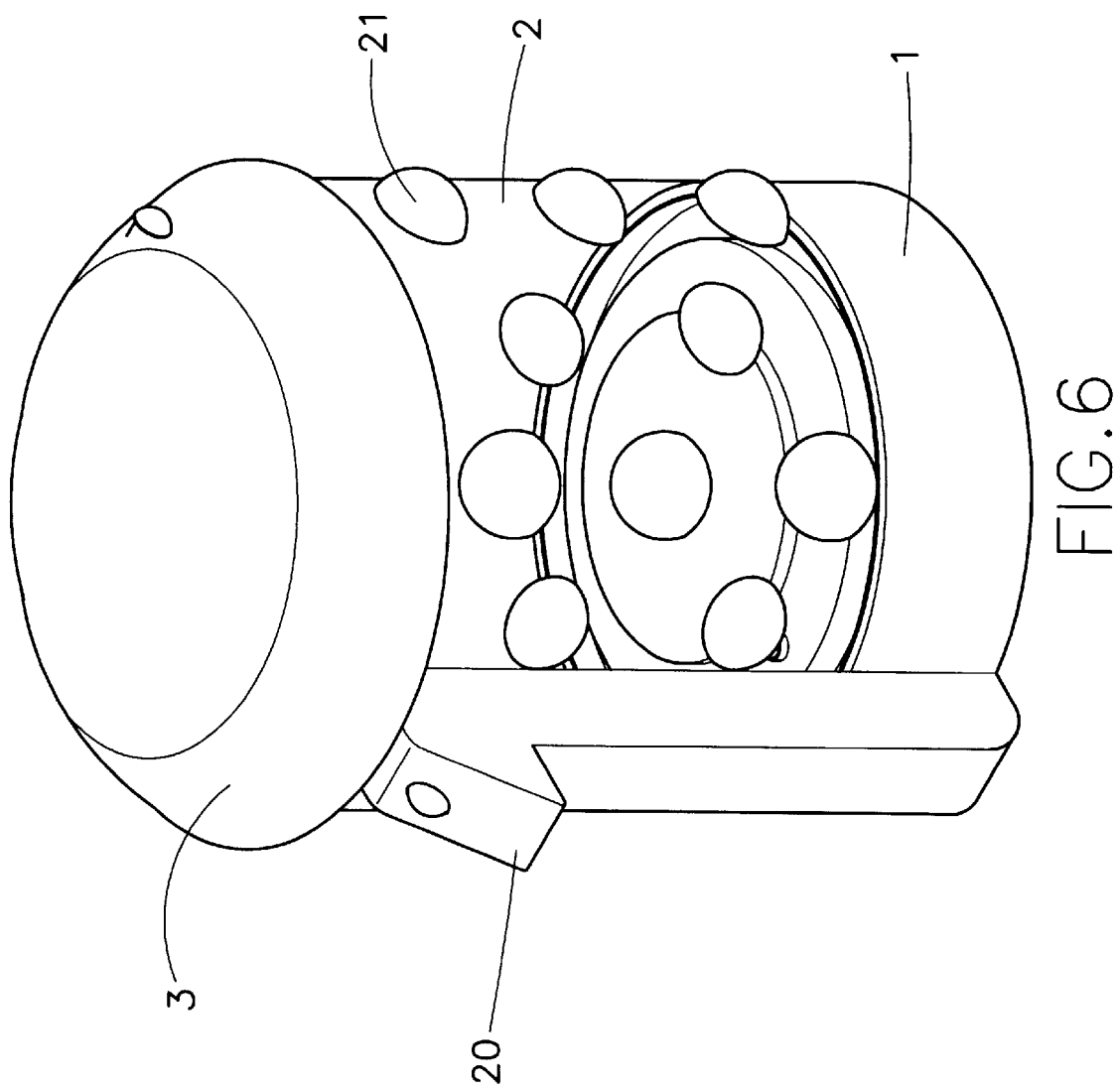
FIG. 6 is a perspective view showing the outlook of the assembled structure of a yet embodiment according to the present invention.

The distribution of the protecting strip 21 is shown in FIG. 3, which are formed as straight axial extending and parallel straight rib, as that shown in FIG. 4, which are formed as parallel transversal ring rib, or as that shown in FIG. 5, which are formed as inclined extending and parallel inclined texture, or as that shown in FIG. 6, which are formed as round particles.

Therefore, it is appreciated since the bottle body 2 is formed integrally with transparent glass, thus the level of water may be seen clearly, namely, the level of water may be seen from any orientation of the periphery of the bottle body 2, Thus, the judgment of the level will not be effected by vapor, capillary, and unbalance of pressure. Furthermore, the user need not rotate the bottle body for viewing the level of water.

Besides, the protecting strip protruded from the bottle body 2 serves to isolate the hand of user and the surface of the bottle body. The protecting strip 21 may be made with a larger thickness or made of material with better heat isolation effect. Thus, it is insured that the hand would not be harmed by heat of bottle body.

Since the bottle body 2 of the hot water bottle are made integrally by transparent glass, thus other complicated finishing procedure are unnecessary. Thus, it is fabricated more easily than conventional hot water bottles, and can be mass-produced with a high speed and a lower cost.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within he scope of the invention as defined in the appended claims.

What is claimed is:

1. An improved structure of a hot water bottle comprising a bottle bottom, a bottle body, and a bottle cover, wherein the bottle bottom is formed with a heating device and a water outlet device, characterized in that the bottle body is made of transparent glass, and a plurality of protruded protecting strip are coupled to the surface thereof in spaced relationship one with respect to another, said protecting strips being formed of a thermally insulative material and spaced sufficiently for contents of the bottle body to be visualized through the transparent glass between said plurality of protruded protecting strips.

2. The improved structure of a hot water bottle comprising a bottle bottom, a bottle body, and a bottle cover, wherein the bottle bottom is formed with a heating device and a water outlet device, characterized in that the bottle body is made of transparent glass, and a plurality of protruded protecting strips are formed on the surface thereof in spaced relationship, said protecting strips being integrally formed with said bottle body of transparent glass and of sufficient thickness to provide a heat isolation effect.

3. The improved structure of a hot water bottle as claimed in claim 1, wherein the protecting strips are adhered to the outer surface of the bottle body.

4. The improved structure of a hot water bottle as claimed in claim 1, wherein the protecting strips are formed as straight axial extending and parallel straight ribs.

5. The improved structure of a hot water bottle as claimed in claim 1, wherein the protecting strips are formed as horizontal and parallel transversal ring ribs.

6. The improved structure of a hot water bottle as claimed in claim 1, wherein the protecting strips are formed as tilting extended and parallel inclined ribs.

7. The improved structure of a hot water bottle as claimed in claim 1, wherein the protecting strips are formed as round convex particles.

8. The improved structure of a hot water bottle as claimed in claim 1, wherein the protecting strips are made of material with preferred heat isolation property.

9. An improved structure of a hot water bottle, comprising:

a bottle body formed of transparent glass;

a bottle cover coupled to an upper end of said bottle body;

a bottle bottom coupled to a lower end of said bottle body, said bottle bottom including a heating device and a water outlet device; and, a plurality of protruding strips coupled to an external surface of said bottle body is spaced relationship sufficient to isolate a user's hand from said bottle body and visualize contents of said bottle body therebetween, each of said plurality of protruding strips having a characteristics, selected from the group consisting of a thickness of each protruding strip or a material composition of each protruding strip, to provide a heat isolating effect therefor.

* * * * *